(No Model.)

C. MATTHEWS & W. HOLT.
GAS MACHINE.

No. 261,011. Patented July 11, 1882.

5 Sheets—Sheet 1.

Witnesses:
Henry T. Bruns.
O. W. Bond.

Inventors
Charles Matthews
William Holt (No Model.) 5 Sheets—Sheet 2.
C. MATTHEWS & W. HOLT.
GAS MACHINE.
No. 261,011. Patented July 11, 1882.
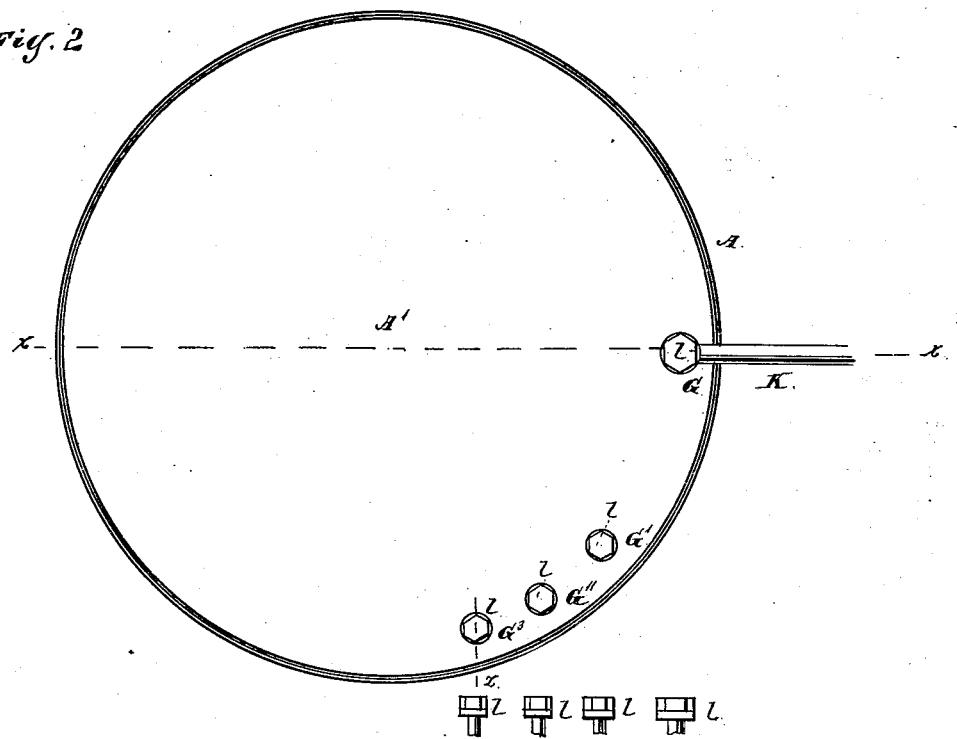
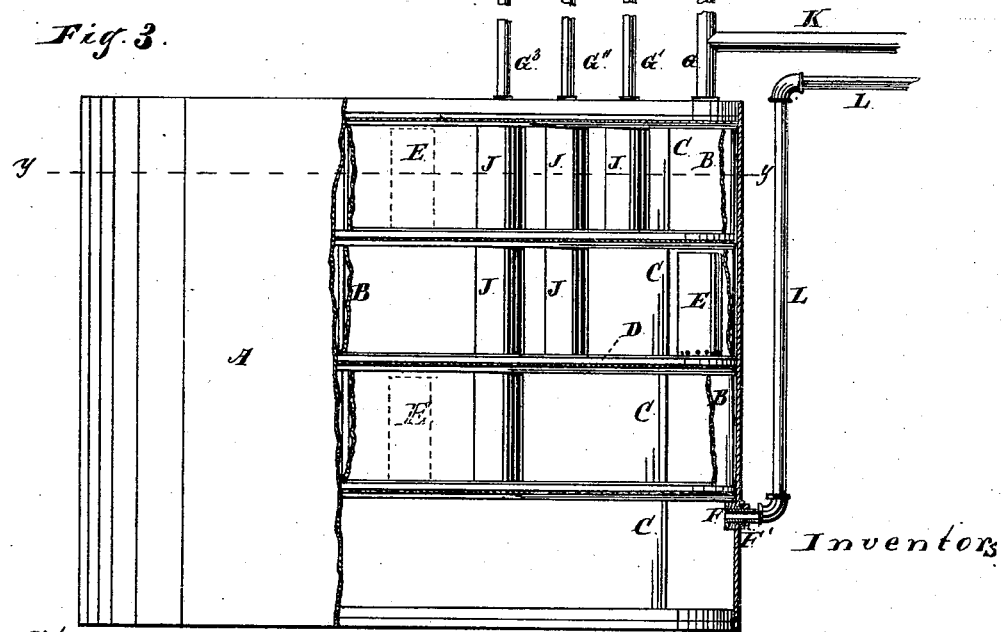
Witnesses:
Charles Matthews
William Holt
Inventors (No Model.) 5 Sheets—Sheet 3.
C. MATTHEWS & W. HOLT.
GAS MACHINE.
No. 261,011. Patented July 11, 1882.

Witnesses:

Inventors
Charles Matthews
William Holt (No Model.) 5 Sheets—Sheet 4.
C. MATTHEWS & W. HOLT.
GAS MACHINE.
No. 261,011. Patented July 11, 1882.
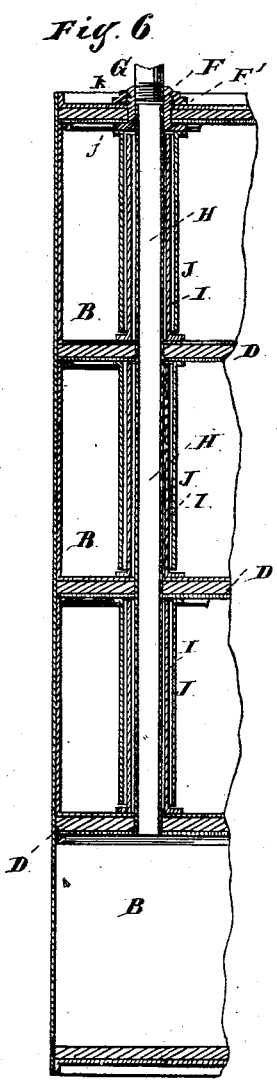
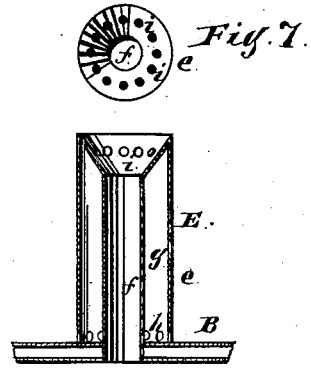
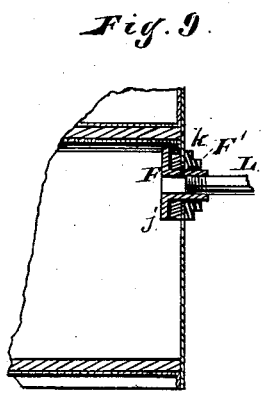
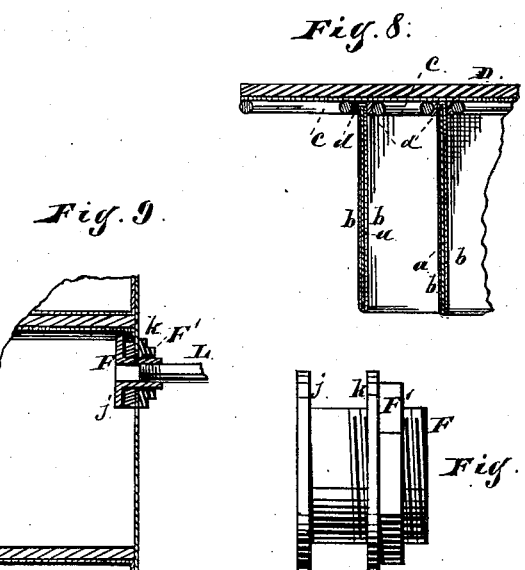
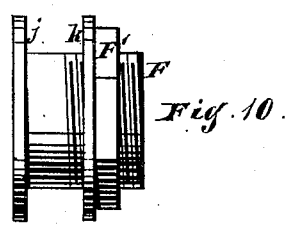
Witnesses:
Henry F. Bruns.
O. W. Bond
Inventors:
Charles Matthews
William Holt (No Model.) 5 Sheets—Sheet 5.

C. MATTHEWS & W. HOLT.
GAS MACHINE.

No. 261,011. Patented July 11, 1882.

Witnesses:
Henry F. Bruns.
O. W. Bond.

Inventors:
Charles Matthews
William Holt

UNITED STATES PATENT OFFICE.

CHARLES MATTHEWS AND WILLIAM HOLT, OF CHICAGO, ILLINOIS.

GAS-MACHINE.

SPECIFICATION forming part of Letters Patent No. 261,011, dated July 11, 1882.

Application filed May 4, 1881. (No model.)

*To all whom it may concern:*

Be it known that we, CHARLES MATTHEWS and WILLIAM HOLT, residing at Chicago, in the county of Cook and State of Illinois, and citizens of the United States, have invented new and useful Improvements in Gas-Machines, of which the following is a full description, reference being had to the accompanying drawings, in which—

Figure 1:
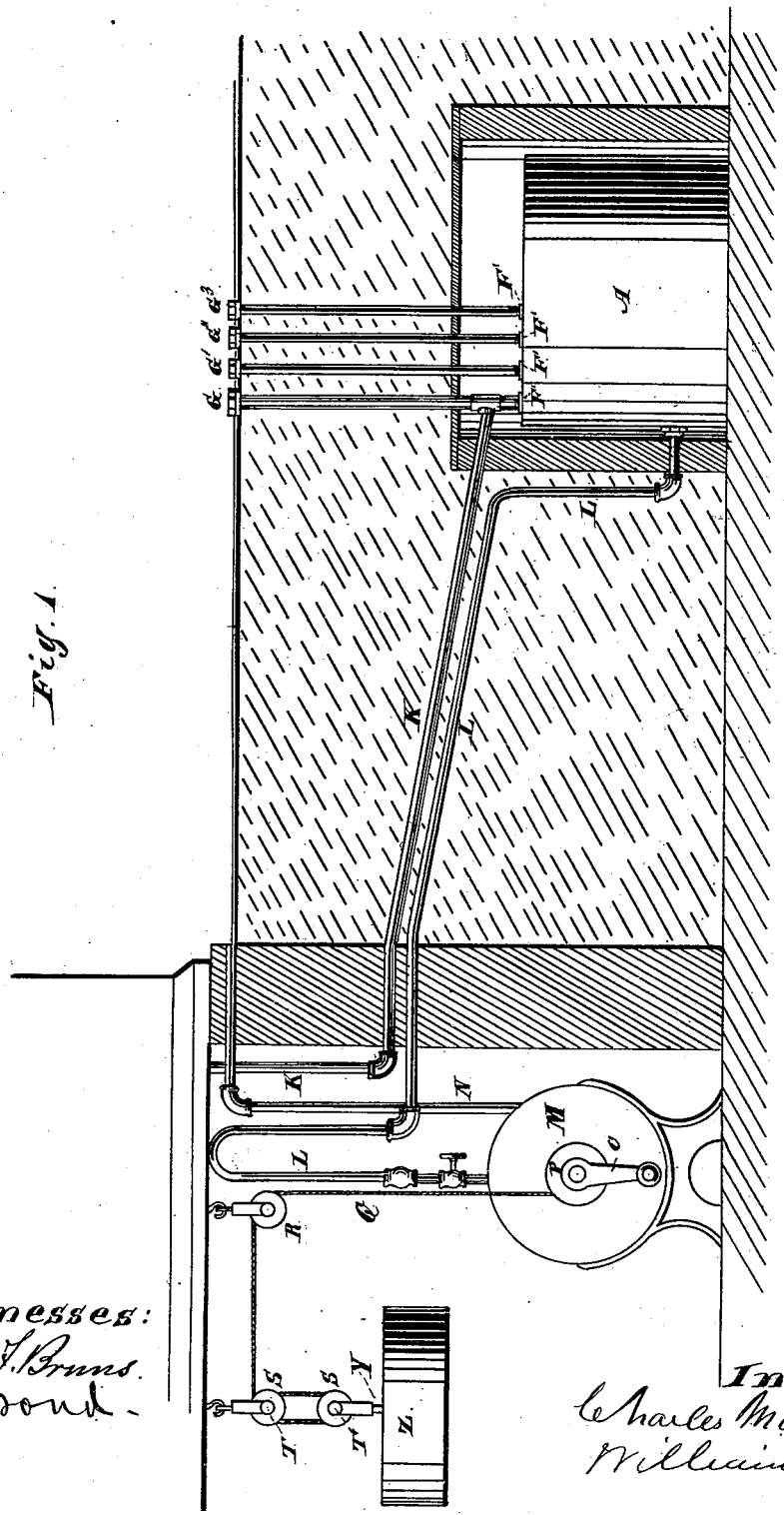
Figure 4:
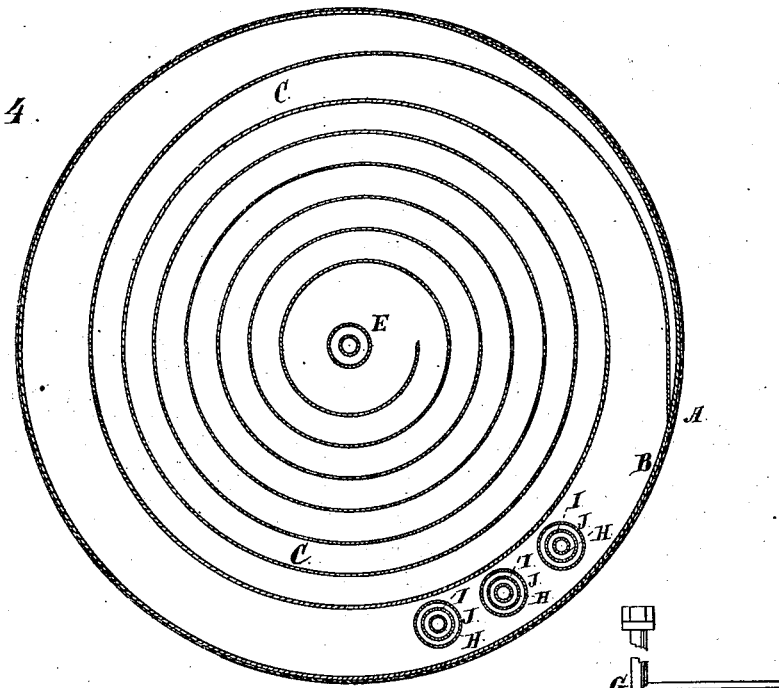
Figure 5:
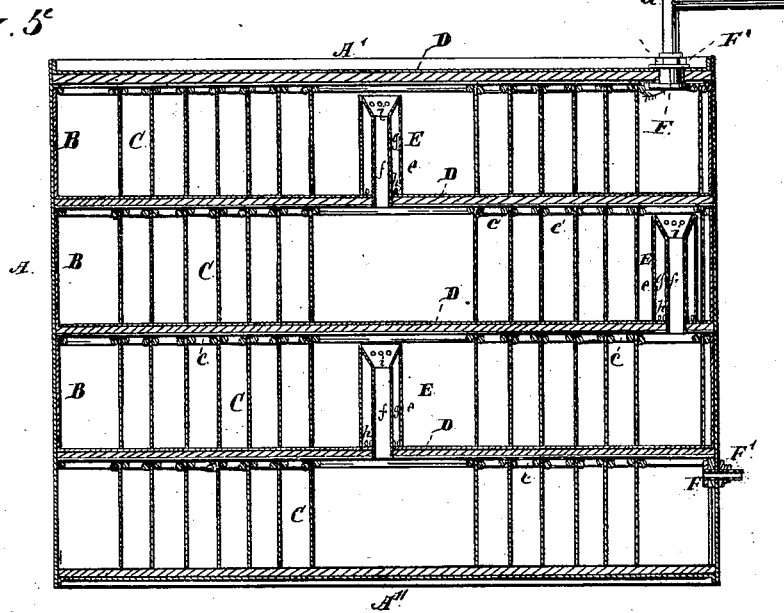
Figure 11:
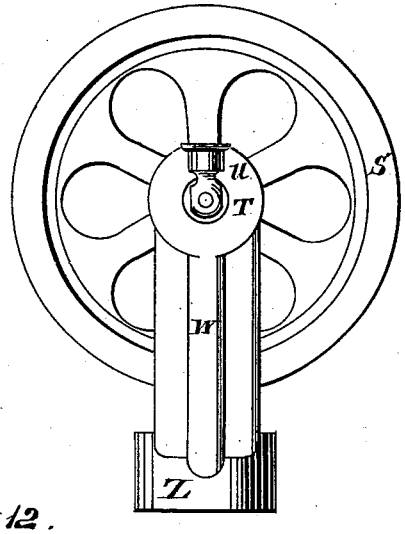
Figure 12:
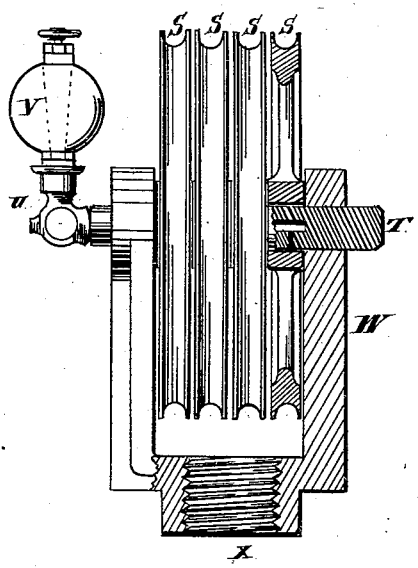
Figure 13:
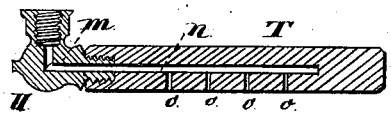
Figure 14:
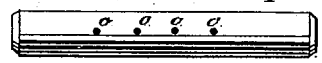

Figure 1 is an elevation showing the arrangement of the air blower or pump, the carburetor, the filling-pipes, air-pipes, and gas-pipes in their several relations to each other, the carburetor being in its vault or buried; Fig. 2, a top or plan view of the carburetor; Fig. 3, a side elevation of the carburetor with a portion of the outer casing broken out to show the interior construction; Fig. 4, a longitudinal section through one division or section of the carburetor; Fig. 5, a central vertical section through the carburetor; Fig. 6, an enlarged detail in section, showing the construction and arrangement of the filling-pipe for the lower pan or receptacle of the carburetor; Fig. 7, an enlarged detail showing the construction of the overflow-tube; Fig. 8, an enlarged detail showing the method of constructing and attaching the spiral air-passage; Fig. 9, an enlarged detail showing the attachment of the coupling; Fig. 10, an enlarged detail showing the form of the coupling; Figs. 11, 12, 13, and 14, enlarged details showing the pulleys and shafts by which the weight for the pump or blower is suspended or carried.

This invention relates to that class of gas-machines in which atmospheric air forced over or through a body of gasoline comes in contact with the vapor of the gasoline, combines therewith, and produces illuminating-gas.

The apparatus usually employed in this class of machines consists of an air blower or pump for producing the blast of air, a carburetor containing the gasoline, over or through which the air is forced to be carbureted, and pipes for conducting air to the blower and carburetor and conveying the gas to the house or building to be illuminated.

In carbureting air with the vapor of gasoline, in order to attain the most perfect and satisfactory results and a proper combining or mingling of the air and vapor, the current of air should be given a course of travel or circulation through the carburetor that will cause it to come in contact with the vapor of the entire body of gasoline, including the heavier portion thereof, and the gasoline should be distributed throughout the carburetor to present as large a surface as possible for contact with the air, and inasmuch as gasoline is very volatile the lighter portion will be carried off, leaving the heavier, unless the air, in passing through the carburetor, is brought in contact with the heavier portion first, for which purpose the residuum or heavy gasoline should be made to pass to the lowest part of the carburetor and the air be caused to enter accordingly and pass upward. The current of air should be continuous and steady when the apparatus is in use, and leakage or passage of the air otherwise than in the line of its circulation should be avoided and prevented. The carburetor should be essentially air-tight in every particular, and the several pipes should be constructed and connected so as to be air-tight and at the same time permit of expansion and contraction, to a slight extent, without breaking or loosening the joints or connections, and the liability of the blower or pump to stop or become unsteady in its movements, by reason of the weight by which it is usually operated becoming stuck or not falling steadily and at a uniform speed, should be overcome.

The object of this invention is to embody the foregoing features with others in the construction of this class of gas machines or apparatus, and thereby insure a perfect and successful operation. This object we accomplish by the construction of apparatus illustrated in the accompanying drawings, and hereinafter described in detail.

In the drawings, A represents the outer casing or receptacle; A' A'', the heads for closing the ends of the casing A; B, the receiving-pans; C, the spiral air conduit or passage; D, the head or support for C; E, the overflow-tube; F F', the coupling for connecting the pipes with the carburetor, which may also be used for other places where a safe coupling is desired; G G' G'' G³, the sections of the filling pipes or tubes leading from the carburetor to the surface of the ground; H, the sections of the filling pipes or tubes leading from the terminus of the ground or surface pipes to the respective pans; I J, the inclosing tubes or shells around the tubes H; K, the gas-pipe leading to the building; L, the air-pipe leading from the pump or blower to the carburetor; M, the air pump or blower; N, the air-pipe leading from the exterior of the building to the air pump or blower; O, the crank for operating the windlass; P, the windlass on which the rope for suspending the weight is wound; Q, the rope for the weight; R, the guide-pulley for maintaining the rope in its proper relation with the windlass and supporting-pulleys; S, the supporting-pulleys around which the rope passes to regulate the descent of the weight and the speed of the blower; T, the shafts on which the weight-pulleys S are mounted; U, the head connecting the shaft T with an oil-cup; V, the oil-cup from which oil or other lubricant passes through the head U and shaft T to the pulleys S; W, the forks or supports in which the shafts T of the pulleys are journaled; X, the screw-threaded head on the frames W for making the connections between the weight, the pulleys, and the support from which the frame of the upper pulley is suspended; Z, the weight; $a$, the wooden interior of the spiral C; $b$, the cloth or other absorbent of the spiral C; $c$, the tie-strips for retaining the spiral C in position; $d$, the packing for closing the joint between the spiral C and support D; $e$, the exterior tube of the overflow E; $f$, the interior tube of the overflow E; $g$, the opening or passage between $e$ and $f$; $h$, the inlet-orifices of the overflow E; $i$, the outlet-orifices of the overflow E; $j$, the flange on the section F of the coupling; $k$, the flange on the section F' of the coupling; $l$, the screw-caps for closing the filling-tubes; $m$, the opening or oil-passage in the head U; $n$, the opening or oil-passage in the shaft T; $o$, the discharge-orifices from the oil-passage $n$.

The exterior casing or receptacle, A, is circular or tubular in form, and may be made of galvanized iron, sheet-copper, or other suitable material, and its dimensions are to be proportioned according to the number of the interior pans and the capacity of the machine. When completed it is to be essentially air-tight, its ends being closed by suitable heads, A' A'', of wood or other material, that can be inserted and be made to tightly close the ends.

The pans B correspond in form and diameter to the form and diameter of the interior of the receptacle, so that they can be readily inserted therein in succession and lie one above the other. These pans may also be made of galvanized iron, sheet-copper, or other suitable material, and when placed in position in the receptacle they can be secured by rivets, bolts, or otherwise, so as to be firm and unyielding. Two or more of these pans can be used. As shown, four are provided.

The conduit or passage for the air through the carburetor is formed from a series of spirals, C, a spiral being provided for each pan, each spiral being attached to a suitable head or support, D, which head corresponds in diameter to the diameter of the respective pans, so that they can be inserted one in the mouth of each pan and close the pan and support the spiral within the pan. The spirals C each consist of an interior, $a$, of thin wood, which can be readily bent into a spiral form, and an exterior, $b$, of cloth or other absorbent material, attached to and entirely covering the wooden interior. Each spiral is attached to its head or support D by means of strips of wood or other material, $c$, which can be bent to produce a spiral, a strip $c$ being placed each side of the spiral, and nailed or otherwise secured to the head so as to retain the spiral in position, and, in order to prevent leakage between the spiral and the head, strips of cloth or other packing, $d$, are placed both sides of the spiral, between it and the strips $c$, and tightly compressed when attaching the spiral, so as to effectually close the joint.

The air, after it enters the receptacle A, must follow the spiral in its passage through each pan, beginning with the lower, suitable openings being provided to allow it to pass from one pan to another, giving it a long course of travel, and causing it to remain a greater length of time in contact with the gasoline, and by making the spiral of thin wood and absorbent material the gasoline can penetrate and permeate through the entire spiral and present a very large surface for retaining the gasoline for contact with the air in passing through the pan, by which the air will become thoroughly impregnated with the vapor.

Each pan B is provided with an overflow-tube, E, which tube, as shown, also serves as the means for the passage of the air from pan to pan. The overflow-tube is formed by an exterior tube, $e$, and an interior tube, $f$, both attached at their lower ends to the bottom of the pan, the bottom of the pan having an opening through it coinciding with the tube $f$. The upper ends of these tubes $e\ f$ are joined by a partition or plate, and an opening or passage, $g$, closed at its lower end by the bottom of the pan, is left between the tubes $e\ f$, which opening communicates with the opening of the tube $f$ by means of the orifices $i$ in the partition or plate at the top of the tubes, and with the pan by means of the orifices $h$ at the lower end of the exterior tube, $e$, so that a communication is formed between the pans by means of the central tube, $f$, passage $g$, and orifices $h\ i$. By this arrangement the heavy gasoline, which naturally sinks to the bottom of the pan, will, as the pan is filled, pass through the openings or orifices $h$ into the passage $g$, thence through the passages or orifices $i$ into the central tube, $f$, and flow into the pan next below, by which means the heavy gasoline will be conducted from the successive pans through the overflow-tubes and deposited in the lower pan, where it will remain until used up by being combined with the air.

The couplings for connecting the pipes with the carburetor require a very strong method of attachment in order to prevent them from tearing out or becoming disjoined. For this purpose the couplings F F' are specially designed. These couplings are each made in two sections or parts, one of which, F, has a tubular body with a longitudinal opening of the required size for the end of the pipe, which body, on its exterior, is provided with a screw-thread, and has at one end a flange or rim, j. The other section, F', has an interior screw-thread corresponding to the thread on F, and is provided with a flange or rim, k, the balance of its exterior presenting a shape suitable to receive a wrench or other device, by means of which it can be screwed on the section F.

In use the section F is inserted in a suitable opening at the point where the coupling is to be made, with its screw-threaded portion projecting and its flange j in contact with the surface around the opening. The nut or section F' is then placed on the projecting end and screwed down until its flange k is in contact with the surface around the opening, when the coupling will be retained firmly in position and a tight joint will be provided, and as the flanges j k are on either side and bear against the material held between them it will be seen that it is impossible to break the joint or tear the coupling out unless the force is sufficient to tear it out bodily. These couplings are located at the points for connecting the filling-pipes and other pipes requiring a firm attachment.

The filling-pipes G G' G'' G³ extend from the surface of the ground to the head of the carburetor, and their upper ends are closed by suitable caps, l, and their inner ends enter their respective couplings, and are connected therewith in any suitable manner, so as not to slip out or become misplaced.

The pipe G leads only to the first pan and terminates there. The other pipes have continuations provided to lead them to their respective pans, and, as shown, the pipe G also serves as an exit for the gas, the pipe leading to the building being suitably connected therewith at a point above the head of the carburetor; but, if desired, a separate exit-pipe for the gas may be provided.

As shown, four pans, B, are provided, and the continuations of the pipes G' G'' G³ lead respectively to the pans following after the first. If more pans are used, the number of filling-pipes and continuations must be correspondingly increased, and if less pans are used their number can be decreased accordingly.

The continuations of the filling-pipes are made as follows: An interior tube, H, corresponding in diameter to the diameter of the opening in the coupling, and of the required length to extend from the coupling to the respective pans, is provided, one end of which tube H is inserted in the opening in the coupling, and the other terminates immediately after passing through the head D of the pan which it is designed to fill, the body of the tube passing through the intermediate pan or pans and the heads D thereof.

Around that portion of each tube which passes through the intermediate pan or pans is a sleeve or tube, I, extending from the bottom of each intermediate pan, to which its end is secured, up to or near the top of the pan, its upper end being left free or unattached, and around this sleeve or tube I is an outer sleeve or tube, J, extending from the head or support D, to which its end is attached, down to or near the bottom of the pan, its lower end being left free or unattached, and between the tubes H I J spaces are left, into which the gasoline can enter and make a fluid joint which will be perfectly air-tight and prevent any leakage around the filling-tubes.

The tube H being loose in the coupling, and one end of the tubes I and J being also free, it will be seen that contraction and expansion will in no wise affect the joint, and that the pipe is free to expand and contract without causing leakage, the ends not slipping to an extent to break the joint.

The form of construction for the filling-tube for the lower pan is shown in Fig. 6, and the tubes for the intermediate pans are similar in construction.

The distributing-pipe K is of the usual construction and arrangement, and leads from the carburetor to the pipes in the building, with an upward inclination, and has sufficient capacity to carry the gas off.

The pipe L is of sufficient capacity to carry the air from the blower to the carburetor. This pipe is connected with the carburetor, so that the air will first pass into the lower pan or chamber and be brought in contact with the heavy gasoline in that chamber, after which the air will pass in succession through the remaining pans or chambers to the place of discharge. This pipe L ascends vertically from the blower to a higher level than the fill-pipes, and then descends and passes to the carburetor, the object being to prevent the gasoline, under any circumstances, from getting into the blower or pump.

The blower or pump M, pipe N, leading to the exterior of the building from the blower, crank O, and windlass P may be of any of the usual and well-known forms of arrangement and construction for such parts, and the rope Q passes, as usual, from the windlass over the guide-pulley R, around the wheels of the pulleys S, to the weight Z, which is attached to its end, so that as the rope is wound on the windlass the weight will be raised, and by its descent will unwind the rope, revolve the windlass, and operate the blower to force a current of air through the pipe L to the carburetor.

The pulleys S are grooved for the reception of the rope Q, and as many pulleys are to be used as are necessary to regulate the descent of the weight and give the required speed to the blower. These pulleys are arranged in two sets or series independent of each other and connected by the rope, and they are mounted upon shafts T, each shaft having a longitudinal central opening or passage, $n$, leading from which, at the proper point to come beneath the hub or bearing of each pulley, is an orifice, $o$. One end of the shaft T is screw-threaded, and receives a head, U, having an opening, $m$, which communicates with the opening $n$ in the shaft, and this head U receives an ordinary oil-cup, V, from which the oil or other lubricant is conducted through the opening or passage $m$ into the opening or passage $n$, out through the orifices $o$, to the pulleys, as required for use, keeping them properly lubricated and preventing them from becoming overheated and adhering to the shaft, so as to interfere with the descent of the weight, by which arrangement the weight is at all times free to descend, as required, to operate the blower, and the blower will operate steadily and uniformly.

Each shaft T is journaled in any suitable manner in the ends of a fork or frame, W, having a head, X, at its closed end, in which is a screw-threaded opening.

The head X of the lower pulley-frame receives or has secured therein a pin, Y, at the center of the weight, by means of which the weight is attached to the pulley, and the head X of the upper pulley has an eyebolt or hook screwed therein, by means of which the pulley can be suspended from the ceiling or other suitable support, so as to be stationary, the lower pulley descending with the weight.

The operation will be readily understood from the foregoing description. The heavy gasoline passes into the lower pan, in the manner described, by means of the overflow-tubes E, and the air from the blower enters the carburetor at this lower pan, passes around the spiral C therein, becomes charged to some extent with the vapor of the gasoline in this pan, passes out through the overflow-tube E or other suitable passage into the next higher pan, and around the spiral of that pan, becomes still further charged with the vapor of the gasoline, and so on through the succeeding pans to the discharge, by which time it has become thoroughly impregnated with the gasoline-vapor. By thus forcing the heavy gasoline to the bottom of the carburetor, and then passing the air in an upward direction through the carburetor, the air will carry off the vapor from the heavier as well as the lighter portion of the gasoline, and thereby insure the consumption or use of all the available portions of the gasoline.

As shown, the overflow-tubes act as air-passages also, and they are arranged in relation to the spiral so as to be at the center or outer edge, accordingly as the air passes from the outer spiral to the center or from the center to the outer spiral. This arrangement is a very desirable one, as it enables the same tube to act as an overflow and an air-passage without detriment to either office. The overflows might all be arranged in a vertical line at the center of the pans, in which case each alternate pan would have to be provided with an independent air-passage at its outer edge; or these overflow-tubes and air-passages could be arranged in some other suitable manner to attain the desired end.

What we claim as new, and desire to secure by Letters Patent, is as follows:

1. An overflow for the receiving-pans of a carburetor, consisting of an exterior tube, $e$, having a series of orifices, $h$, and an interior tube, $f$, joined to the outer tube by an inclined plate having orifices $i$, leaving a passage, $g$, between the two tubes, whereby the heavy gasoline will flow from the bottom of the pan into the next lower pan, substantially as and for the purposes specified.

2. In a carburetor, a spiral air conduit or passage, C, formed by a thin piece of wood bent into a spiral form and covered with an absorbent material to permit the gasoline to permeate and penetrate over and through the spiral and present a large surface for contact with the air, substantially as specified.

3. In a carburetor, a receiving-pan, B, having an overflow operating from the bottom of the pan, in combination with a spiral air conduit or passage, C, formed of thin wood covered with an absorbent material, for passing the air through the pan in contact with the gasoline, substantially as and for the purposes specified.

4. In a carburetor, a receiving-pan, B, having an overflow, E, operating to take the gasoline from the bottom of the pan, in combination with a spiral air passage or conduit, C, and head or support D, to which the spiral is attached, for conducting air through the pan and preventing leakage or travel outside of the spiral, substantially as specified.

5. In a carburetor, a spiral air conduit or passage, C, consisting of thin wood bent into a spiral form and covered with an absorbent material, and attached to a head or support, D, by strips $c$, and a packing, $d$, for giving the air, in its passage through the carburetor, a circuitous line of travel and preventing leakage, substantially as specified.

6. In a carburetor, an interior filling-pipe for the pans, consisting of a tube, H, a sleeve or tube, I, attached to the bottom of the pan, and a sleeve or tube, J, attached to the head or support, with openings or passages between the tubes for the passage of the gasoline to form a fluid joint and prevent leakage, substantially as specified.

CHARLES MATTHEWS.
WILLIAM HOLT.

Witnesses:
O. W. BOND,
A. H. ADAMS.